United States Patent

[11] 3,540,584

[72] Inventors Joseph Francis Laukaitis;
Milton Edwin Meerdink; Robert Joseph
Herberger, Rochester, New York
[21] Appl. No. 790,658
[22] Filed Jan. 13, 1969
[45] Patented Nov. 17, 1970
[73] Assignee Eastman Kodak Company
Rochester, New York
a corporation of New Jersey

[54] DIVERTING MEANS FOR CONVEYOR SYSTEM
12 Claims, 4 Drawing Figs.
[52] U.S. Cl. .................................................. 209/73,
209/74; 198/24
[51] Int. Cl. ..................................................... B07c 3/06
[50] Field of Search ........................................... 198/24,
165, 162; 209/74, 73, 80

[56] References Cited
UNITED STATES PATENTS
3,199,673  8/1965  Flint ............................. 209/79
3,451,546  6/1969  Murley .......................... 209/73

*Primary Examiner*—Allen N. Knowles
*Assistant Examiner*—Gene A. Church
*Attorneys*—Walter O. Hodson and William E. Jackson ABSTRACT: A device for diverting unsealed cartons from a position in a high speed production line at the output of a cartoner which normally seals the flaps of cartons. The device functions to divert a group of cartons which remain unsealed because of a prior stoppage of the cartoner. A control means insures that only unsealed cartons are diverted from the normal output of sealed cartons although the control means can be arranged so that any carton can be removed, sealed or unsealed, as desired.

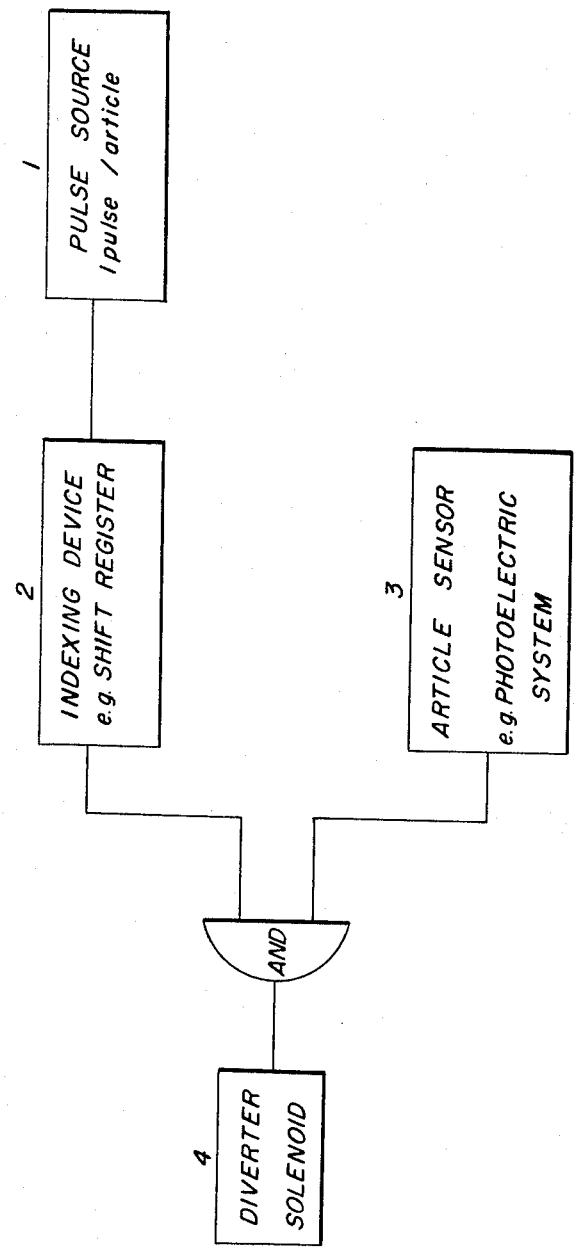

Patented Nov. 17, 1970
3,540,584
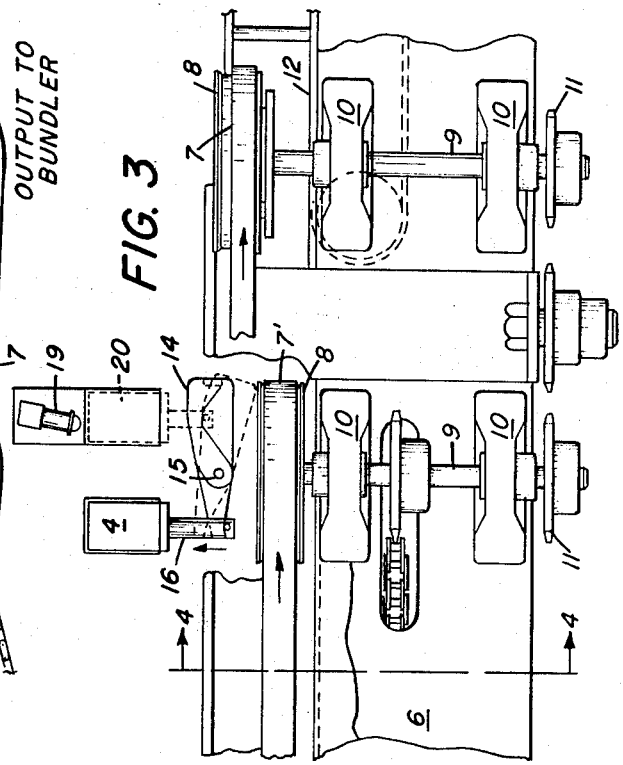
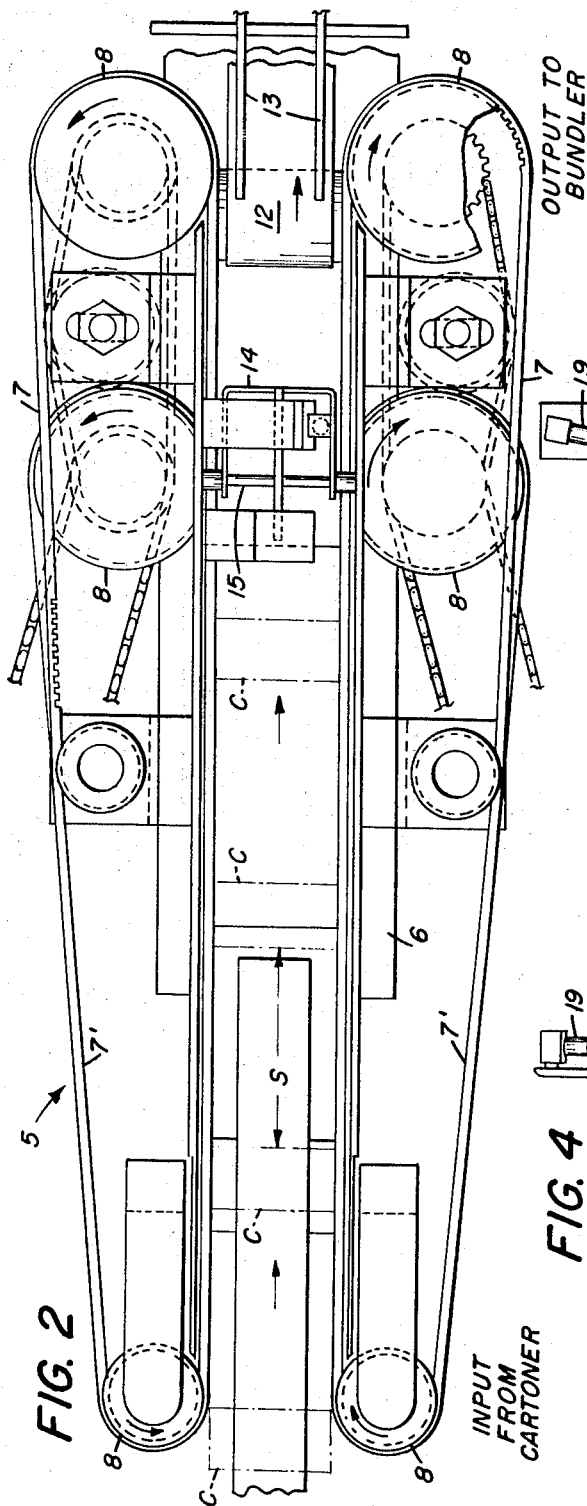
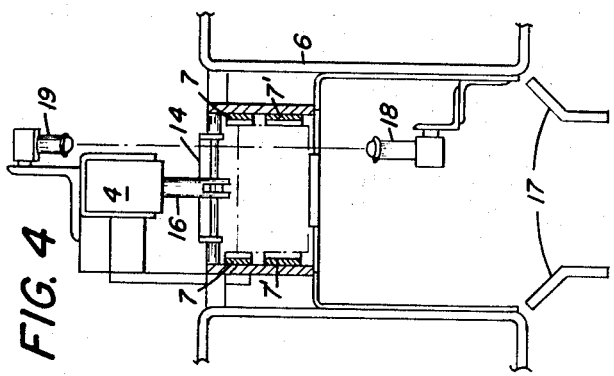
JOSEPH F. LAUKAITIS
MILTON E. MEERDINK
ROBERT J. HEBERGER
INVENTORS
ATTORNEY & AGENT

DIVERTING MEANS FOR CONVEYOR SYSTEM

This invention relates in general to conveyor systems of the type used for distributing such articles as cartons and the like in a production line, and more particularly, this invention relates to an improved means for diverting selected articles from such conveyor systems.

Many industries presently use production lines to manufacture their products more economically. Many such lines perform a variety of operations to arrive at the final product which is then cartoned and bundled automatically prior to shipment to the customer. Although these production lines are often designed to run continuously, stoppages of the lines may occur during equipment malfunctions, or the like. When starting the production lines after a stoppage, it is desirable to provide some means to remove products from the line which are improperly or incompletely processed as a result of the stoppage.

By way of example, cartoners are currently available for continuously packaging products in sealed cartons at a relatively high rate, e.g. 500 per minute. These cartoners may use heat-activated glue for sealing the flaps of the cartons. The output of the cartoners may be fed to conveyor systems which carry the cartons to equipment which bundles them for shipping. However, if the cartoner is stopped, then a group of unsealed cartons may be produced if heat is not applied to activate the glue. When the cartoner is started again, it is desirable to remove the group of unsealed cartons from the production line so that they will not be shipped to the customer. While the group of unsealed cartons could be removed manually, a more reliable and rapid removal would be desirable.

An object of the present invention is to provide a diverting device which is adapted to withdraw selected articles from a production line without requiring attention on the part of an operator.

Another object of the invention is to provide an improved and highly reliable device which may be used in conjunction with conventional cartoners for diverting unsealed cartons from the production line after a stoppage of the same.

Still a further object of the invention is to provide a diverting device which will operate at high speeds without jamming and which is especially adapted to be operated by automatic control systems.

Other objects and advantages of the present invention will be apparent to those skilled in the art by the description of a preferred embodiment of the invention which follows.

The objects of the present invention are accomplished by a diverting device which includes one pair of conveyor belts which normally embrace and convey spaced articles from an input to an output position. A second pair of conveyor belts normally embrace and convey the same spaced articles but, unlike the first, the second pair do not extend to the output position. Thus, the spaced articles are normally conveyed, first by four embracing belts, and then by two belts between the intermediate point, where the second belts end, and the output position. A diverter means is arranged to divert a selected group of cartons from their normal path after they pass the intermediate point. The diverter means may be selectively operated by a control means which includes an indexing device, means to signal the indexing device after each article enters at the input position, and means to detect an article before it approaches the intermediate point.

Reference is now made to the accompanying drawings wherein like reference numerals and characters designate the parts and wherein:

FIG. 1 is a schematic view of the control means for operating the diverting means so that selected group of articles will be removed from a conveyor system;

FIG. 2 is a plan view of a preferred embodiment of the present invention;

FIG. 3 is a side view of the right-hand portion of FIG. 1;

FIG. 4 is a sectional view taken along line 4-4 in FIG. 3.

FIG. 1 is a schematic view showing the general cooperation of elements to cause diversion of a selected group of articles from a production line. Although these elements and their principles of operation could be used to effect diversion of various articles from production lines of many types, they will be described in relation to a cartoner which uses heat-sensitive glue to seal the flaps of cartons. It should be apparent that the disclosed elements and principles could also be applied to equipment for filling cartons, wrapper-applying equipment, and the like. For purposes of illustration, it is assumed that the cartoner has been stopped and there is a group of six unsealed cartons within the sealing section of the cartoner. When the cartoner is started up again, the group of unsealed cartons should be diverted from the subsequent production line. This diversion is reliably accomplished by a system including the control elements of FIG. 1.

Indexing device 2, which may be a conventional shift register, is automatically armed, as though it has received six pulses, if the cartoner is stopped longer than 15 seconds, which is the time required for the heat-sensitive glue to harden. For purposes of illustration, it is further assumed that indexing device 2 can count a total of 12 pulses before indicating a reject condition. When the cartoner is started, the indexing device 2 will count the number of machine cycle pulses subsequently received from pulse source 1. This pulse source 1 produces one pulse for each cartoner cycle, equivalent to a time of a carton passing through the cartoner. After six cycles of the cartoner, the indexing device 2 will be set to a reject condition, e.g. six pulses upon arming and six more pulses after starting. At this time, the group of six unsealed cartons will have moved to a point outside and downstream of the cartoner. Just downstream of the first of these six unsealed cartons, a sensor 3 is located. This sensor may be a photoelectric system which produces a signal each time a carton passes its location. The system of FIG. 1 is designed to use a conventional "and" circuit so that, if the indexing device 2 indicates a reject condition and the sensor 3 detects a carton, then a signal operates the solenoid 4 of the carton diverter means shown in detail in FIGS. 2—4. The indexing device 2 is such that it will indicate a reject condition for six successive cycles of the cartoner (corresponding to the fixed number in the group of unsealed cartons produced whenever the cartoner is stopped). Thus, the solenoid 4 of the diverter means will be energized until the indexing device 2 no longer indicates a reject condition and the group of six unsealed cartons will be diverted from the production line. As soon as the indexing device 2 does not indicate a reject condition, and the last carton has been diverted as indicated by sensor 3, the solenoid for the diverter means will be deenergized and the sealed cartons following after the diverted group will pass in their normal manner out of the cartoner to subsequent operations in the production line.

The system of FIG. 1 can be designed so that the unsealed carton output, due to a series of closely spaced starts and stops of the cartoner, will be reliably diverted. The system would operate in substantially the same manner as described above but would also have the capability to rearm the indexing device 2 each time the cartoner is stopped even if only several machine cycles had preceded the rearming.

The system described above for FIG. 1 can be assembled from known mechanical and electrical elements. For example, the pulses from the cartoner can be created by interrupting a photoelectrically sensed light beam for each carton, the indexing device can be a shift register having a series of suitably connected relays, and the sensor 3 can be a light source and photocell as shown in FIGS. 2 to 4.

The device according to a preferred embodiment of the present invention is shown in FIGS. 2 to 4. The left-hand end, or input position, of device 5 receives cartons C from a conventional cartoner (not shown). Device 5 comprises a frame 6 which mounts an upper pair of endless rubber conveyor belts 7 and a similar lower pair of belts 7'. These belts are mounted on the frame 6 by means of pulleys 8, pulley shafts 9, and pillow blocks 10. The belts 7, 7' are simultaneously driven at the same speed by means of a chain drive (not shown) connecting the cartoner to the sprockets 11. The device 5 extends from the input position, to the right-hand end, or output position, which is adjacent a conveyor 12 for the infeed of cartons C to a bundler (not shown). Conveyor 12 travels at about the same speed as the belts 7, 7', so that delivery of cartons C is smooth and carton spacing S is maintained. Guide rails 13 confine the cartons C so they do not tip over during transition. As best seen in FIGS. 2 and 3, the upper pair of conveyor belts 7 extend from the input to the output positions of the device 5 while the lower pair of rubber conveyor belts 7' extend only to an intermediate position between the input and output positions. The length of the belts 7, 7' between the input and intermediate positions may be selected to provide sufficient setting time for the heat-sensitive glue on the flaps of cartons C. As seen in FIG. 4, the upper side portions of a carton C are embraced by belts 7 while the lower portions of the carton are embraced by belt 7'. Adjacent the intermediate position, frame 6 pivotally mounts a diverter arm 14 on a shaft 15. Diverter arm 14 is coupled to a plunger 16 of solenoid 4. Solenoid 4 may be energized selectively according to the procedures described above in connection with FIG. 1 to divert cartons C downwardly into a chute 17, or the like.

Frame 6 also mounts a light source 18 and a photocell 19 for detecting a carton C prior to the intermediate position on device 5. These elements operate in a manner described above in connection with sensor 3 in FIG. 1 to energize solenoid 4 when the carton C is the leading carton of a group of unsealed cartons supplied from the cartoner (not shown) after a stoppage. After the leading carton C is sensed, diverter arm 14 is moved by solenoid 4 to the dotted position in FIG. 3 and is held there until the entire group of unsealed cartons C are forced downwardly from between upper belts 7 which embrace the cartons C after they pass the intermediate position between the input and output positions.

The belts 7 and 7' receive individual cartons at the input position of the device 5. The speed of the cartons C, imparted by the conveyor 5 relative to the cartoner (not shown), is such that normal spacing S can be maintained between cartons passing through device 5. This spacing is of particular advantage to the reliable diversion of unsealed cartons C at high speed without jamming. This spacing provides sufficient space for the diverter arm 14 to be moved to its lower position between belts 7 preceeding the first unsealed carton in the group to be diverted and to its withdrawn position after the last of the group of unsealed cartons. To further insure the properly timed withdrawal of the arm, solenoid 20 can be added as shown in dashed lines in FIG. 2. This solenoid can be used to give more positive withdrawal movement of the diverter lever 14.

As an example of the present invention, cartons have been diverted from a production line moving at rates up to 500 cartons per minute. The device was capable of diverting a group of six unsealed cartons and then resuming the normal conveying of correctly sealed cartons from the cartoner to the infeed of the bundler conveyor.

The invention has been described in detail with particular reference to preferred embodiments thereof, but it will be understood that variations and modifications can be effected within the spirit and scope of the invention.

We claim:

1. A device adapted to move articles from an input to an output position and to divert selected articles as they move between said positions, said device comprising:
   a. a first pair of endless conveyor means adapted to embrace articles and extending between said input and output positions;
   b. a second pair of endless conveyor means adapted to embrace articles and extending from said input position to an intermediate position located between said input and output positions;
   c. means mounting said first and second pair of conveyor means for embracing and moving articles; and
   d. means mounted adjacent said intermediate position to divert articles from the embrace of said first pair of conveyor means as they move from said intermediate to said output position.

2. The invention of claim 1 wherein said means for mounting said first and second pairs of conveyor means comprise at lease two pairs of pulleys, respectively, said first pair of conveyor means having pulleys at said input and output positions, and said second pair of conveyor means having pulleys at said input and said intermediate positions.

3. The invention of claim 1 wherein said article diverting means comprises:
   a pivotally mounted arm;
   a solenoid plunger connected to said arm; and
   a solenoid for moving said plunger to move the end of said arm into a position between the conveyor means of said first pair so that it engages and diverts articles from the embrace of said first pair of conveyor means.

4. The invention of claim 3 wherein said first and second pair of endless conveyor means are adapted to embrace upper and lower side portions of an article, respectively.

5. A device adapted to normally move sealed cartons from a cartoner to the infeed conveyor for a carton bundler and further adapted to divert unsealed cartons as they move between said cartoner and said conveyor, said device comprising:
   a. a first pair of endless conveyor belts adapted to embrace cartons and extending between said cartoner and said infeed conveyor;
   b. a second pair of endless conveyor belts adapted to embrace cartons and extending from said cartoner to an intermediate position located between said cartoner and said infeed conveyor;
   c. means mounting said first and second pair of belts for embracing and moving cartons; and
   d. means mounted adjacent said intermediate position to divert unsealed cartons from the embrace of said first pair of belts as they move from said intermediate position to said infeed conveyor.

6. The invention of claim 5 wherein said means for mounting said first and second pairs of belts comprise at least two pairs of pulleys, respectively, said first pair of belts having pulleys adjacent said cartoner and said infeed conveyor, and second pair of belts having pulleys adjacent said cartoner and said intermediate position.

7. The invention of claim 5 wherein said carton diverting means comprises:
   a pivotally mounted arm;
   a solenoid plunger connected to said arm; and
   a solenoid for moving said plunger to move the end of said arm into a position between the belts of said first pair so that it engages and diverts unsealed cartons from the embrace of said first pair of belts.

8. The invention of claim 7 wherein said first and second pair of endless belts are adapted to embrace upper and lower side portions of a carton, respectively.

9. The invention of claim 2 wherein said articles diverting means comprises:
   a pivotally mounted arm;
   a solenoid plunger connected to said arm; and
   a solenoid for moving said plunger to move the end of said arm into a position between the conveyor means of said first pair so that it engages and diverts articles from the embrace of said first pair of conveyor means.

10. The invention of claim 9 wherein said first and second pair of endless conveyor means are adapted to embrace upper and lower side portions of an article, respectively.

11. The invention of claim 6 wherein said carton diverting means comprises:
    a pivotally mounted arm;
    a solenoid plunger connected to said arm; and
    a solenoid for moving said plunger to move the end of said arm into a position between the belts of said first pair so that it engages and diverts unsealed cartons from the embrace of said first pair of belts.

12. The invention of claim 11 wherein said first and second pair of endless belts are adapted to embrace upper and lower side portions of a carton, respectively.